US006757395B1

(12) United States Patent
Fang et al.

(10) Patent No.: US 6,757,395 B1
(45) Date of Patent: Jun. 29, 2004

(54) NOISE REDUCTION APPARATUS AND METHOD

(75) Inventors: Xiaoling Fang, Draper, UT (US); Michael J. Nilsson, Sandy, UT (US)

(73) Assignee: Sonic Innovations, Inc., Salt Lake City, UT (US)

( * ) Notice: Subject to any disclaimer, the term of this patent is extended or adjusted under 35 U.S.C. 154(b) by 0 days.

(21) Appl. No.: 09/482,192

(22) Filed: Jan. 12, 2000

(51) Int. Cl.[7] ................................................ H04B 15/00
(52) U.S. Cl. ....................... 381/94.3; 704/226; 704/233
(58) Field of Search .............................. 381/94.3, 94.1, 381/94.2; 704/226, 233

(56) References Cited

U.S. PATENT DOCUMENTS

| | | | | |
|---|---|---|---|---|
| 3,578,913 | A | 5/1971 | Ufken | 179/1 |
| 3,685,009 | A | 8/1972 | Fleming, Jr. | 340/16 R |
| 3,692,959 | A | 9/1972 | Lamp | 179/175.1 A |
| 3,824,345 | A | 7/1974 | Cowpland | 179/1 VL |
| 3,893,038 | A | 7/1975 | Omata et al. | 330/124 R |
| 3,920,931 | A | 11/1975 | Yanick, Jr. | 179/107 FD |
| 3,928,733 | A | 12/1975 | Hueber | 179/107 R |
| 4,025,721 | A | 5/1977 | Graupe et al. | 179/1 |
| 4,061,875 | A | 12/1977 | Freifeld et al. | 179/1 |
| 4,122,303 | A | 10/1978 | Chaplin et al. | |
| 4,135,590 | A | 1/1979 | Gaulder | 179/1 P |

(List continued on next page.)

FOREIGN PATENT DOCUMENTS

| | | | |
|---|---|---|---|
| EP | 0 064 042 | 11/1982 | H04R/25/00 |
| EP | 0 064 042 | 1/1986 | H04R/25/00 |
| EP | 0 823 829 | 2/1998 | H04R/25/00 |
| WO | WO 97/50186 | 12/1997 | |
| WO | 98/28943 | 7/1998 | H04R/25/00 |
| WO | WO 98/43567 | 10/1998 | |
| WO | WO 98/47227 | 10/1998 | |
| WO | 99/26453 | 5/1999 | H04R/25/00 |
| WO | WO 99/45741 | 9/1999 | |

OTHER PUBLICATIONS

Boll, S., "Suppression of Acoustic Noise in Speech Using Spectral Subtraction," Apr. 1979, IEEE Trans. on ASSP, vol. ASSP-27, pp. 113–120.

(List continued on next page.)

*Primary Examiner*—Minsun Oh Harvey
*Assistant Examiner*—Brian Pendleton
(74) *Attorney, Agent, or Firm*—Thelen Reid & Priest LLP

(57) ABSTRACT

A multi-band spectral subtraction scheme is proposed, comprising a multi-band filter architecture, noise and signal power detection, and gain function for noise reduction. In one embodiment, the gain function for noise reduction consists of a gain scale function and a maximum attenuation function providing a predetermined amount of gain as a function of signal to noise ratio ("SNR") and noise. In one embodiment, the gain scale function is a three-segment piecewise linear function, and the three piecewise linear sections of the gain scale function include a first section providing maximum expansion up to a first knee point for maximum noise reduction, a second section providing less expansion up to a second knee point for less noise reduction, and a third section providing minimum or no expansion for input signals with high SNR to minimize distortion. According to embodiments of the present invention, the maximum attenuation function can either be a constant or equal to the estimated noise envelope. The disclosed noise reduction techniques can be applied to a variety of speech communication systems, such as hearing aids, public address systems, teleconference systems, voice control systems, or speaker phones. When used in hearing aid applications, the noise reduction gain function according to aspects of the present invention is combined with the hearing loss compensation gain function inherent to hearing aid processing.

20 Claims, 5 Drawing Sheets

U.S. PATENT DOCUMENTS

| | | | | |
|---|---|---|---|---|
| 4,185,168 A | | 1/1980 | Graupe et al. | 179/1 P |
| 4,187,472 A | | 2/1980 | Yum | 330/260 |
| 4,188,667 A | | 2/1980 | Graupe et al. | 364/724 |
| 4,216,430 A | | 8/1980 | Amazawa et al. | 455/219 |
| 4,238,746 A | | 12/1980 | McCool et al. | 333/166 |
| 4,243,935 A | | 1/1981 | McCool et al. | 324/77 R |
| 4,249,128 A | | 2/1981 | Karbowski | |
| 4,326,172 A | | 4/1982 | Schmidt | 330/294 |
| 4,355,368 A | | 10/1982 | Zeidler et al. | 364/728 |
| 4,368,459 A | | 1/1983 | Sapora | 340/407 |
| 4,396,806 A | | 8/1983 | Anderson | 179/107 FD |
| 4,494,074 A | | 1/1985 | Bose | |
| 4,545,065 A | | 10/1985 | Visser | 381/41 |
| 4,548,082 A | | 10/1985 | Engebretson et al. | 73/585 |
| 4,589,133 A | | 5/1986 | Swinbanks | |
| 4,589,137 A | | 5/1986 | Miller | 381/94 |
| 4,602,337 A | | 7/1986 | Cox | 364/480 |
| 4,628,529 A | | 12/1986 | Borth et al. | 381/94 |
| 4,630,305 A | * | 12/1986 | Borth et al. | 381/94.3 |
| 4,654,871 A | | 3/1987 | Chaplin et al. | |
| 4,658,426 A | | 4/1987 | Chabries et al. | 381/94 |
| 4,718,099 A | | 1/1988 | Hotvet | 381/68.4 |
| 4,723,294 A | | 2/1988 | Taguchi | 381/94 |
| 4,759,071 A | | 7/1988 | Heide | 381/68.4 |
| 4,783,818 A | | 11/1988 | Graupe et al. | 381/71 |
| 4,802,227 A | | 1/1989 | Elko et al. | 381/92 |
| 4,878,188 A | | 10/1989 | Ziegler, Jr. | |
| 4,887,299 A | | 12/1989 | Cummins et al. | 381/68.4 |
| 4,912,767 A | | 3/1990 | Chang | 381/47 |
| 4,939,685 A | | 7/1990 | Feintuch | 364/724.19 |
| 4,953,217 A | | 8/1990 | Twiney et al. | |
| 4,956,867 A | | 9/1990 | Zurek et al. | 381/94.1 |
| 4,985,925 A | | 1/1991 | Langberg et al. | |
| 5,016,280 A | | 5/1991 | Engebretson et al. | 381/68 |
| 5,027,306 A | | 6/1991 | Dattorro et al. | 364/724.1 |
| 5,091,952 A | | 2/1992 | Williamson et al. | 381/68.2 |
| 5,097,510 A | | 3/1992 | Graupe | 381/47 |
| 5,105,377 A | | 4/1992 | Ziegler, Jr. | |
| 5,111,419 A | | 5/1992 | Morley, Jr. et al. | 364/724.19 |
| 5,165,017 A | | 11/1992 | Eddington et al. | 381/68.4 |
| 5,177,755 A | | 1/1993 | Johnson | |
| 5,225,836 A | | 7/1993 | Morley, Jr. et al. | 341/150 |
| 5,251,263 A | | 10/1993 | Andrea et al. | |
| 5,291,525 A | | 3/1994 | Funderburk et al. | 375/98 |
| 5,355,418 A | | 10/1994 | Kelsey et al. | 381/72 |
| 5,357,251 A | | 10/1994 | Morley, Jr. et al. | 341/172 |
| 5,396,560 A | | 3/1995 | Arcos et al. | 381/68 |
| 5,412,735 A | | 5/1995 | Engebretson et al. | 381/94 |
| 5,452,361 A | | 9/1995 | Jones | |
| 5,473,684 A | | 12/1995 | Bartlett et al. | 379/387 |
| 5,475,759 A | | 12/1995 | Engebretson | 381/68.2 |
| 5,500,902 A | | 3/1996 | Stockham, Jr. et al. | 381/68.4 |
| 5,511,128 A | | 4/1996 | Lindemann | 381/92 |
| 5,539,831 A | | 7/1996 | Harley | |
| 5,544,250 A | * | 8/1996 | Urbanski | 381/94.3 |
| 5,600,729 A | | 2/1997 | Darlington et al. | |
| 5,651,071 A | | 7/1997 | Lindemann et al. | 381/68.2 |
| 5,710,820 A | | 1/1998 | Martin et al. | 381/68.4 |
| 5,721,783 A | | 2/1998 | Anderson | 381/68.6 |
| 5,794,187 A | | 8/1998 | Franklin et al. | 704/225 |
| 5,825,898 A | | 10/1998 | Marash | 381/92 |
| 5,838,801 A | | 11/1998 | Ishige et al. | 381/68.4 |
| 5,848,169 A | | 12/1998 | Clark, Jr. et al. | |
| 5,848,171 A | | 12/1998 | Stockham, Jr. et al. | 381/321 |
| 5,867,581 A | | 2/1999 | Obara | 381/312 |
| 5,937,070 A | | 8/1999 | Todter et al. | |
| 6,023,517 A | | 2/2000 | Ishige | 381/315 |
| 6,035,048 A | * | 3/2000 | Diethorn | 381/94.3 |
| 6,044,162 A | | 3/2000 | Mead et al. | 381/312 |
| 6,072,884 A | | 6/2000 | Kates | |
| 6,072,885 A | | 6/2000 | Stockham, Jr. et al. | 381/321 |
| 6,118,878 A | | 9/2000 | Jones | |
| 6,173,063 B1 | | 1/2001 | Melanson | |
| 6,219,427 B1 | | 4/2001 | Kates et al. | |
| 6,278,786 B1 | | 8/2001 | McIntosh | |
| 6,396,930 B1 | | 5/2002 | Vaudrey et al. | |

OTHER PUBLICATIONS

Brey, Robert H. et al., "Improvement in Speech Intelligibility in Noise Employing an Adaptive Filter with Normal and Hearing–Impaired Subjects," Journal of Rehabilitation Research and Development, vol. 24, No. 4, pp. 75–86.

Chabries, Douglas M. et al., "Application of Adaptive Digital Signal Processing to Speech Enhancement for the Hearing Impaired", Journal of Rehabilitation Research and Development, vol. 24, No. 4, pp. 65–74.

Chabries, et al., "Noise Reduction by Amplitude Warping in the Spectral Domain in a Model–Based Algorithm", Jun. 11, 1997, Etymotic Update, No. 15.

Crozier, P. M., et al., "Speech Enhancement Employing Spectral Subtraction and Linear Predictive Analysis," 1993, Electronic Letters, 29(12): 1094–1095.

Killion, Mead, "The SIN Report: Circuits Haven't Solved the Hearing–in–Noise Problem," Oct. 1997, The Hearing Journal, vol. 50, No. 20, pp. 28–34.

Sedra, A.S. et al., "Microelectronic Circuits", 1990, Holt Rinehart and Winston, pp. 60–65, 230–239, 900.

Sheikhzadeh, H. et al., "Comparative Performance of Spectral Subtraction and HMM–Based Speech Enhancement Strategies with Application to Hearing Aid Design," 1994, Proc. IEEE, ICASSP, pp. I–13 to I–17.

Yost, William A., "Fundamentals of Hearing, An Introduction," 1994, Academic Press, Third Edition, p. 307.

Berouti, et al., "Enhancement of Speech Corrupted by Acoustic Noise", Apr. 1979, Proceedings of the IEEE Conference on Acoustics, Speech and Signal Processing, pp. 208–211.

Ephraim, et al., "Speech Enhancement Using a Minimum Mean–Square Error Short–Time Spectral Amplitude Estimator", Dec. 1984, IEEE Transactions on Acoustics, Speech, and Signal Processing, vol. ASSP–32, No. 6, pp. 1109–1121.

Etter et al., "Noise Reduction by Noise–Adaptive Spectral Magnitude Expansion", May 1994, J. Audio Eng. Soc., vol. 42, No. 5, pp. 341–348.

George, E. Bryan, "Single–Sensor Speech Enhancement Using a Soft–Decision/Variable Attenuation Algorithm", 1995, IEEE, pp. 816–819.

Gustafsson, et al., "A Novel Psychoacoustically Motivated Audio Enhancement Algorithm Preserving Background Noise Characteristics", 1998, IEEE, pp. 397–400.

Lim, et al., "Enhancement and Bandwidth Compression of Noisy Speech", 1979, IEEE, vol. 67, No. 12, pp. 1586–1604.

Quateri, et al., "Noise Reduction Based on Spectral Change", MIT Lincoln Laboratory, Lexington, MA, 4 pages.

Virag, Nathalie, "Speech enhancement Based on Masking Properties of the Auditory System", 1995 IEEE, pp. 796–799.

Kates, James M., "Feedback Cancellation in Hearing Aids: Results from a Computer Simulation", 1991, IEEE, Transactions on Signal Processing, vol. 39, No. 3, pp. 553–562.

Kuo, et al., "Integrated Frequency–Domain Digital Hearing Aid with the Lapped Transform", Sep. 10, 1992, Northern Illinois University, Department of Electrical Engineering, 2 pages.

Lim, et al., "Enhancement and Bandwidth Compression of Noisy Speech", 1979 IEEE, vol. 67, No. 12, pp. 1586–1604.
Maxwell, et al., "Reducing Acoustic Feedback in Hearing Aids", 1995, IEEE, Transactions on Speech and Audio Processing, vol. 3, No. 4, pp. 304–313.
Norsworthy, Steven R., "Delta–Sigma Data Converters", IEEE Circuits & Systems Society, pp. 321–324.
Riley, et al., "High–Decimation Digital Filters", 1991, IEEE, pp. 1613–1615.
Siqueira et al., "Subband Adaptive Filtering Applied to Acoustic Feedback Reduction in Hearing Aids", 1997 IEEE, pp. 788–792.
Stockham, Thomas G., Jr., "The Application of Generalized Linearity to Automatic Gain Control", Jun. 1968, IEEE, Transactions on Audio and Electroacoustics, vol. AU–16, No. 2, pp. 267–270.
Wyrsch et al., "Adaptive Feedback Canceling Subbands for Hearing Aids", 4 pages.
Bustamante, et al. "Measurement and Adaptive Suppression of Acoustic Feedback in Hearing Aids", Nicolet Instruments, Madison, Wisconsin, pp. 2017–2020.
Chabries, et al., "Application of a Human Auditory Model to Loudness Perception and Hearing Compensation", 1995, IEEE, pp. 3527–3530.

"Delta–Sigma Overview", Fall 1996, ECE 627, 29 pages.

Estermann, Pius, "Feedback Cancellation in Hearing Aids: Results from Using Frequency–Domain Adaptive Filters", pp. 257–260.

Kaelin et al., "A digital frequency–domain implementation of a very high gain hearing aid with compensation for recruitment of loudness and acoustic echo cancellation", 1998, Signal Processing 64, pp. 71–85.

Karema, et al., "An Oversampled Sigma–Delta A/D Converter Circuit Using Two–Stage Fourth Order Modulator", 1990, IEEE, International Symposium on Circuits and Systems, vol. 4., pp. 3279–3282.

* cited by examiner

Table of Gain Scale Functions

| | | 500Hz | 750Hz | 1000Hz | 1500Hz | 2000Hz | 3000Hz | 4000Hz | 6000Hz | 8000Hz |
|---|---|---|---|---|---|---|---|---|---|---|
| | B0 | 9 | 9 | 9 | 9 | 9 | 9 | 9 | 9 | 9 |
| | B1 | 18 | 18 | 18 | 18 | 18 | 18 | 18 | 18 | 18 |
| | k0 | 0.0328 | 0.0328 | 0.0328 | 0.0308 | 0.0287 | 0.0267 | 0.0246 | 0.0246 | 0.0328 |
| low | b0 | -0.4444 | -0.4444 | -0.4444 | -0.4167 | -0.3889 | -0.3611 | -0.3333 | -0.3333 | -0.4444 |
| | k1 | 0.0164 | 0.0164 | 0.0164 | 0.0154 | 0.0144 | 0.0133 | 0.0123 | 0.0123 | 0.0164 |
| | b1 | -0.2963 | -0.2963 | -0.2963 | -0.2778 | -0.2593 | -0.2407 | -0.2222 | -0.2222 | -0.2963 |
| | k2 | 0 | 0 | 0 | 0 | 0 | 0 | 0 | 0 | 0 |
| | b2 | 0 | 0 | 0 | 0 | 0 | 0 | 0 | 0 | 0 |
| | B0 | 9 | 9 | 9 | 9 | 9 | 9 | 9 | 9 | 9 |
| | B1 | 18 | 18 | 18 | 18 | 18 | 18 | 18 | 18 | 18 |
| | k0 | 0.0492 | 0.0492 | 0.0492 | 0.0472 | 0.0451 | 0.0431 | 0.041 | 0.039 | 0.0451 |
| medium | b0 | -0.6667 | -0.6667 | -0.6667 | -0.6389 | -0.6111 | -0.5833 | -0.5556 | -0.5278 | -0.6111 |
| | k1 | 0.0246 | 0.0246 | 0.0246 | 0.0236 | 0.0226 | 0.0215 | 0.0205 | 0.0195 | 0.0226 |
| | b1 | -0.4444 | -0.4444 | -0.4444 | -0.4259 | -0.4074 | -0.3889 | -0.3704 | -0.3519 | -0.4074 |
| | k2 | 0 | 0 | 0 | 0 | 0 | 0 | 0 | 0 | 0 |
| | b2 | 0 | 0 | 0 | 0 | 0 | 0 | 0 | 0 | 0 |
| | B0 | 9 | 9 | 9 | 9 | 9 | 9 | 9 | 9 | 9 |
| | B1 | 18 | 18 | 18 | 18 | 18 | 18 | 18 | 18 | 18 |
| | k0 | 0.0656 | 0.0656 | 0.0656 | 0.0636 | 0.0615 | 0.0595 | 0.0574 | 0.0554 | 0.0615 |
| high | b0 | -0.8889 | -0.8889 | -0.8889 | -0.8611 | -0.8333 | -0.8056 | -0.7778 | -0.75 | -0.8333 |
| | k1 | 0.0328 | 0.0328 | 0.0328 | 0.0318 | 0.0308 | 0.0297 | 0.0287 | 0.0277 | 0.0308 |
| | b1 | -0.5926 | -0.5926 | -0.5926 | -0.5741 | -0.5556 | -0.537 | -0.5185 | -0.5 | -0.556 |
| | k2 | 0 | 0 | 0 | 0 | 0 | 0 | 0 | 0 | 0 |
| | b2 | 0 | 0 | 0 | 0 | 0 | 0 | 0 | 0 | 0 |

FIG. 4

NOISE REDUCTION APPARATUS AND METHOD

BACKGROUND OF THE INVENTION

1. Field of the Invention

The present invention relates to electronic hearing devices and electronic systems for sound reproduction. More particularly the present invention relates to noise reduction to preserve the fidelity of signals in electronic hearing aid devices and other electronic sound systems. According to the present invention, the noise reduction devices and methods utilize digital signal processing techniques.

The current invention can be used in any speech communication device where speech is degraded by additive noise. Without limitation, applications of the present invention include hearing aids, telephones, assistive listening devices, and public address systems.

2. The Background Art

This invention relates generally to the field of enhancing speech degraded by additive noise as well as its application in hearing aids when only one microphone input is available for processing. The speech enhancement refers specifically to the field of improving perceptual aspects of speech, such as overall sound quality, intelligibility, and degree of listener fatigue.

Background noise is usually an unwanted signal when attempting to communicate via spoken language. Background noise can be annoying, and can even degrade speech to a point where it cannot be understood. The undesired effects of interference due to background noise are heightened in individuals with hearing loss. As is known to those skilled in the art, one of the first symptoms of a sensorineural hearing loss is increased difficulty understanding speech when background noise is present.

This problem has been investigated by estimating the Speech Reception Threshold ("SRT"), which is the speech-to-noise ratio required to achieve a 50% correct recognition level, usually measured using lists of single-syllable words. In most cases, hearing impaired people require a better speech-to-noise ratio in order to understand the same amount of information as people with normal hearing, depending on the nature of the background noise.

Hearing aids, which are one of the only treatments available for the loss of sensitivity associated with a sensorineural hearing loss, traditionally offer little benefit to the hearing impaired in noisy situations. However, as is known to those skilled in the art, hearing aids have been improved dramatically in the last decade, most recently with the introduction of several different kinds of digital hearing aids. These digital hearing aids employ advanced digital signal processing technologies to compensate for the hearing loss of the hearing impaired individual.

However, as is known to those skilled in the art, most digital hearing aids still do not completely solve the problem of hearing in noise. In fact, they can sometimes aggravate hearing difficulties in noisy environments. One of the benefits of modern hearing aids is the use of compression circuitry to map the range of sound associated with normal loudness into the reduced dynamic range associated with a hearing loss. The compression circuitry acts as a nonlinear amplifier and applies more gain to soft signals and less gain to loud signals so that hearing impaired individuals can hear soft sounds while keeping loud sounds from becoming too loud and causing discomfort or pain. However, one of the consequences of this compression circuitry is to reduce the signal-to-noise ratio ("SNR"). As more compression is applied, the signal-to-noise ratio is further degraded. In addition, amplification of soft sounds may make low-level circuit noise audible and annoying to the user.

As is known to those skilled in the art, the general field of noise reduction, i.e., the enhancement of speech degraded by additive noise, has received considerable attention in the literature since the mid-1970s. The main objective of noise reduction is ultimately to improve one or more perceptual aspects of speech, such as overall quality, intelligibility, or degree of listener fatigue.

Noise reduction techniques can be divided into two major categories, depending on the number of input signal sources. Noise reduction using multi-input signal sources requires using more than one microphone or other input transducer to obtain the reference input for speech enhancement or noise cancellation. However, use of multi-microphone systems is not always practical in hearing aids, especially small, custom devices that fit in or near the ear canal. The same is true for many other small electronic audio devices such as telephones and assistive listening devices.

Noise reduction using only one microphone is more practical for hearing aid applications. However, it is very difficult to design a noise reduction system with high performance, since the only information available to the noise reduction circuitry is the noisy speech contaminated by the additive background noise. To further aggravate the situation, the background may be itself be speech-like, such as in an environment with competing speakers (e.g., a cocktail party).

Various noise reduction schemes have been investigated, such as spectral subtraction, Wiener filtering, maximum likelihood, and minimum mean square error processing. Spectral subtraction is computationally efficient and robust as compared to other noise reduction algorithms. As is known to those skilled in the art, the fundamental idea of spectral subtraction entails subtracting an estimate of the noise power spectrum from the noisy speech power spectrum. Several publications concerning spectral subtraction techniques based on short-time spectral amplitude estimation have been reviewed and compared in Jae S. Lim & Alan V. Oppenheim, "*Enhancement and Bandwidth Compression of Noisy Speech*," PROC. IEEE, Vol. 67, No. 12, pp. 1586–1604, December 1979.

However, as is known to those skilled in the art, there are drawbacks to these spectral subtraction methods, in that a very unpleasant residual noise remains in the processed signal (in the form of musical tones), and in that speech is perceptually distorted. Since the review of the literature mentioned above, some modified versions of spectral subtraction have been investigated in order to reduce the residual noise. This is described in SAEED V. VASEGHI, ADVANCED SIGNAL PROCESSING AND DIGITAL NOISE REDUCTION (John Wiley & Sons Ltd., 1996).

According to these modified approaches, the noisy received audio signal may be modeled in the time domain by the equation:

$$x(t)=s(t)+n(t),$$

where x(t), s(t) and n(t) are the noisy signal, the original signal, and the additive noise, respectively. In the frequency domain, the noisy signal can be expressed as:

$$X(f)=S(f)+N(f),$$

where $X(f)$, $S(f)$, and $N(f)$ are the Fourier transforms of the noisy signal, of the original signal, and of the additive noise, respectively. Then, the equation describing spectral subtraction techniques may be generalized as:

$$|\hat{S}(f)|=|H(f)|\cdot|X(f)|,$$

where $|\hat{S}(f)|$ is an estimate of the original signal spectrum $|S(f)|$, and $|H(f)|$ is a spectral gain or weighting function for adjustment of the noisy signal magnitude spectrum. As is known to those skilled in the art, the magnitude response $|H(f)|$ is defined by:

$$|H(f)|=G(R(f))=[1-\mu(R(f))^{\alpha}]^{\beta},$$

$$R(f)=\frac{|\hat{N}(f)|}{|X(f)|},$$

where $\hat{N}(f)$ is the estimated noise spectrum. Throughout this document, the signal-to-noise ratio ("SNR") is defined as the reciprocal of $R(f)$. For magnitude spectral subtraction techniques, the exponents used in the above set of equations are $\alpha=1$, $\beta=1$, $\mu=1$, and for power spectral subtraction techniques, the exponents used are $\alpha=2$, $\beta=0.5$, $\mu=1$. The parameter $\mu$ controls the amount of noise subtracted from the noisy signal. For full noise subtraction, $\mu=1$, and for over-subtraction, $\mu>1$.

The spectral subtraction technique yields an estimate only for the magnitude of the speech spectrum $S(f)$, and the phase is not processed. That is, the estimate for the spectral phase of the speech is obtained from the noisy speech, i.e., $\arg[\hat{S}(f)]=\arg[X(f)]$.

Due to the random variations in the noise spectrum, spectral subtraction may produce negative estimates of the power or magnitude spectrum. In addition, very small variations in SNR close to 0 dB may cause large fluctuations in the spectral subtraction amount. In fact, the residual noise introduced by the variation or erroneous estimates of the noise magnitude can become so annoying that one might prefer the unprocessed noisy speech signal over the spectrally subtracted one.

To reduce the effect of residual noise, various methods have been investigated. For example, Berouti et al. (in M. Berouti, R. Schwartz, and J. Makhoul, "Enhancement of Speech Corrupted by Additive Noise," in Proc. IEEE Conf. on Acoustics, Speech and Signal Processing, pp. 208–211, April 1979) suggested the use of a "noise floor" to limit the amount of reduction. Using a noise floor is equivalent to keeping the magnitude of the transfer function or gain above a certain threshold. Boll (in S. F. Boll, "Reduction of Acoustic Noise in Speech Using Spectral Subtraction," IEEE Trans. Acoust., Speech, Signal Process., vol. ASSP-27, pp. 113–120, April 1979) suggested magnitude averaging of the noisy speech spectrum. Soft-decision noise reduction filtering (see, e.g., R. J. McAulay & M. L. Malpass, "Speech Enhancement Using a Soft Decision Noise reduction Filter," IEEE Trans. on Acoust., Speech, Signal Proc., vol. ASSP-28, pp.137–145, April 1980) and optimal Minimum Mean-Square Error ("MMSE") estimation of the short-time spectral amplitude (see, e.g., Y. Ephraim and D. Malah, "Speech Enhancement Using a Minimum Mean-square Error Short-time Spectral Amplitude Estimator," IEEE Trans. on Acoust., Speech, Signal Proc., vol. ASSP-32, pp. 1109–1121, December 1984) have also been introduced for this purpose.

In 1994, Walter Etter (see Walter Etter & George S. Moschytz, "Noise Reduction by Noise-Adaptive Spectral Magnitude Expansion," J. Audio Eng. Soc., Vol. 42, No. 5, May 1994) proposed a different weighting function for spectral subtraction, which is described by the following equation:

$$G(R(f))=[A(f)\cdot R(f)]^{1-\alpha(f)}.$$

The underlying idea of this technique is to adapt the crossover point of the spectral magnitude expansion in each frequency channel based on the noise and gain scale factor $A(f)$, so this method is also called noise-adaptive spectral magnitude expansion. Similarly the gain is post-processed by averaging or by using a low-pass smoothing filter to reduce the residual noise.

U.S. Pat. No. 5,794,187 (issued to D. Franklin) discloses another gain or weighting function for spectral subtraction in a broad-band time domain. In that document, the gain transfer function is modeled as:

$$G=\frac{X_{rms}}{X_{rms}+\alpha},$$

where $X_{rms}$ is the RMS value of the input noisy signal, and $\alpha$ is a constant.

Recently, a psychoacoustic masking model has been incorporated in spectral subtraction to reduce residual noise or distortion by finding the best tradeoff between noise reduction and speech distortion. For further information, see N. Virag. "Speech Enhancement Based on Masking Properties of the Auditory System," Proc. ICASSP, pp. 796–799, 1995, Stefan Gustafsson, Peter Jax & Peter Vary, "A Novel Psychoacoustically Motivated Audio Enhancement Algorithm Preserving Background Noise Characteristics," Proc. ICASSP, pp. 397–400, 1998, and T. F. Quatieri & R. A. Baxter, "Noise Reduction Based on Spectral Change," IEEE workshop on Applications of Signal Processing to Audio and Acoustics, 1997.

It is well-known that a human listener will not perceive any additive signals as long as their power spectral density lies completely below the auditory masking threshold. Therefore, complete removal of noise is not necessary in most situations. Referring to the publications mentioned above, N. Virag attempted to adjust the parameters $\alpha$, $\beta$ and $\mu$ adaptively in the spectral subtraction equation so that the noise was reduced to the masking threshold. Stefan Gustafsson suggested that a perceptually complete removal of noise is neither necessary, nor desirable in most situations. In a telephone application, for example, a retained low-level natural sounding background noise will give the far end user a feeling of the atmosphere at the near end and will also avoid the impression of an interrupted transmission. Therefore, noise should only be reduced to an expected amount. In his noise-spectrum subtraction method, the weighting function is chosen in such a way that the difference between the desired and the actual noise level lies exactly at the masking threshold.

Applications of noise reduction in hearing aids have been investigated. As mentioned above, hearing aids are very sensitive to power consumption. Thus, the most challenging problem of noise reduction in hearing aids is the compromise between performance and complexity. In addition, a hearing aid inherently has its own gain adjustment function for hearing loss compensation. Cummins (in U.S. Pat. No. 4,887,299) developed a gain compensation function for both noise reduction and hearing loss compensation, which is a function of the input signal energy envelope. The gain consists of three piecewise linear sections in the decibel domain, including a first section providing expansion up to a first knee point for noise reduction, a second section providing linear amplification, and a third section providing compression to reduce the effort of over range signals and minimize loudness discomfort to the user. Finally, U.S. Pat.

No. 5,867,581 discloses a hearing aid that implements noise reduction by selectively turning on or off the output signal or noisy bands.

Spectral subtraction for noise reduction is very attractive due to its simplicity, but the residual noise inherent to this technique can be unpleasant and annoying. Hence, various gain or weighting functions G(*f*), as well as noise estimation methods in spectral subtraction have been investigated to solve this problem. It appears that the methods which combine auditory masking models have been the most successful. However, these algorithms are too complicated to be suitable for application in low-power devices, such as hearing aids. Hence, a new multi-band spectral subtraction scheme is proposed, which differs in its multi-band filter architecture, noise and signal power detection, and gain function. According to the present invention, spectral subtraction is performed in the dB domain. The circuitry and method of the present invention is relatively simple, but still maintains high sound quality.

Thus, it is an object of the present invention to provide a simple spectral subtraction noise reduction technique suitable for use in low-power applications that still maintains high sound quality. These and other features and advantages of the present invention will be presented in more detail in the following specification of the invention and the associated figures.

SUMMARY OF THE INVENTION

A multi-band spectral subtraction scheme is proposed, comprising a multi-band filter architecture, noise and signal power detection, and gain function for noise reduction. In one embodiment, the gain function for noise reduction consists of a gain scale function and a maximum attenuation function providing a predetermined amount of gain as a function of signal to noise ratio ("SNR") and noise. In one embodiment, the gain scale function is a three-segment piecewise linear fuinction, and the three piecewise linear sections of the gain scale function include a first section providing maximum expansion up to a first knee point for maximum noise reduction, a second section providing less expansion up to a second knee point for less noise reduction, and a third section providing minimum or no expansion for input signals with high SNR to minimize distortion. According to embodiments of the present invention, the maximum attenuation function can either be a constant or equal to the estimated noise envelope. The disclosed noise reduction techniques can be applied to a variety of speech communication systems, such as hearing aids, public address systems, teleconference systems, voice control systems, or speaker phones. When used in hearing aid applications, the noise reduction gain function according to aspects of the present invention is combined with the hearing loss compensation gain function inherent to hearing aid processing.

BRIEF DESCRIPTION OF THE DRAWINGS

FIG. 4. is a table of gain scale function coefficients according to one embodiment of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons, having the benefit of this disclosure.

Figure 1:
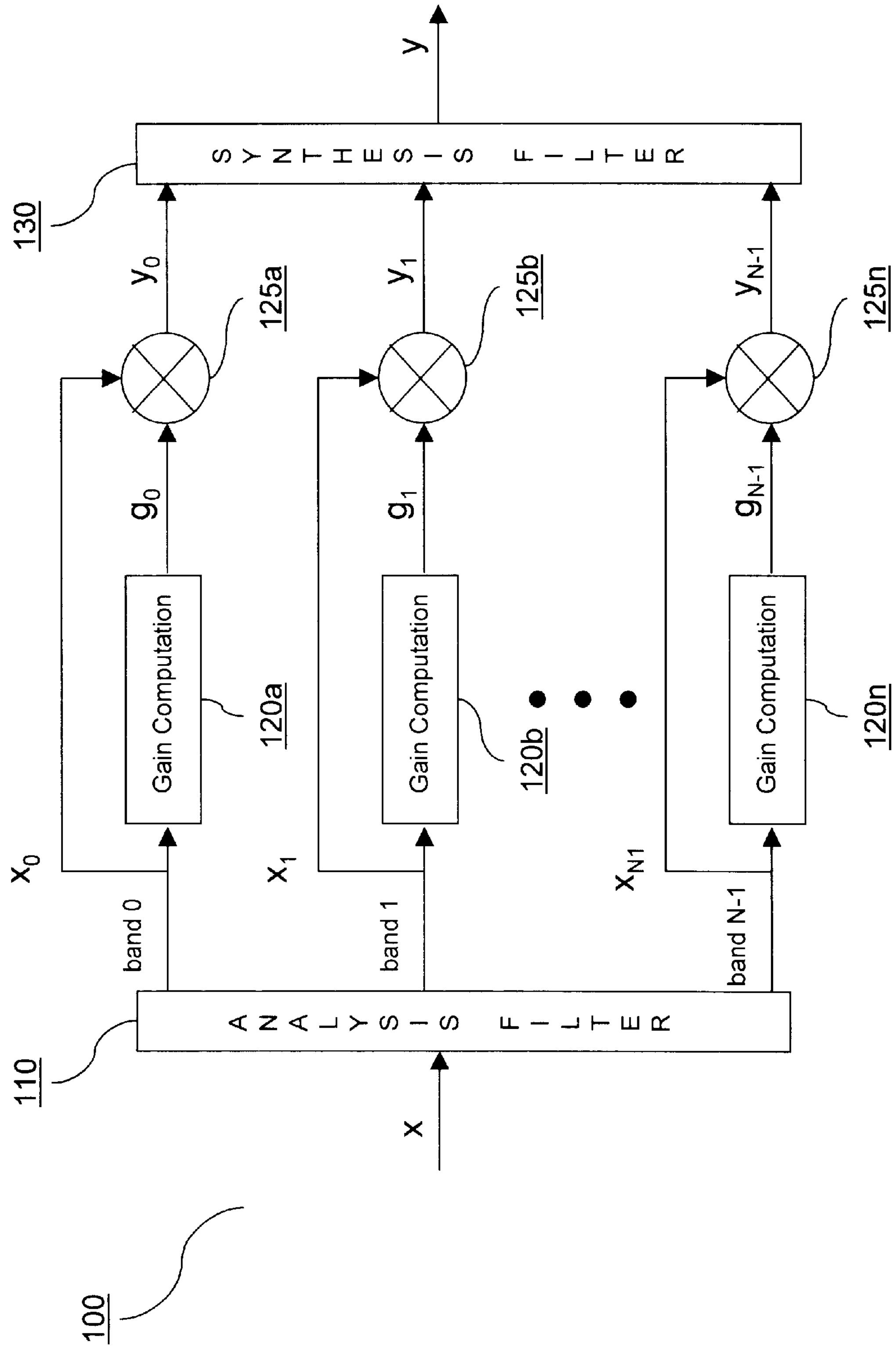
FIG. 1 is a block diagram illustrating a multiband spectral subtraction processing system according to aspects of the present invention.

Referring now to FIG. 1, a block diagram of the multi-band spectral subtraction technique that can be used according to embodiments of the present invention is shown. As illustrated in FIG. 1, the multi-band spectral subtraction apparatus 100 used in embodiments of the present invention includes an analysis filter 110, multiple channels of gain computation circuitry 120*a*–120*n* followed by a corresponding feed-forward multiplier 125*a*–125*n*, and a synthesis filter 130. As those skilled in the art will recognize, the analysis filter 110 can be either a general filter bank or a multi-rate filter bank. Correspondingly, the synthesis filter 130 can be implemented simply as an adder, as a multi-rate full-band reconstruction filter, or as any other equivalent structure known to those skilled in the art.

Figure 2:
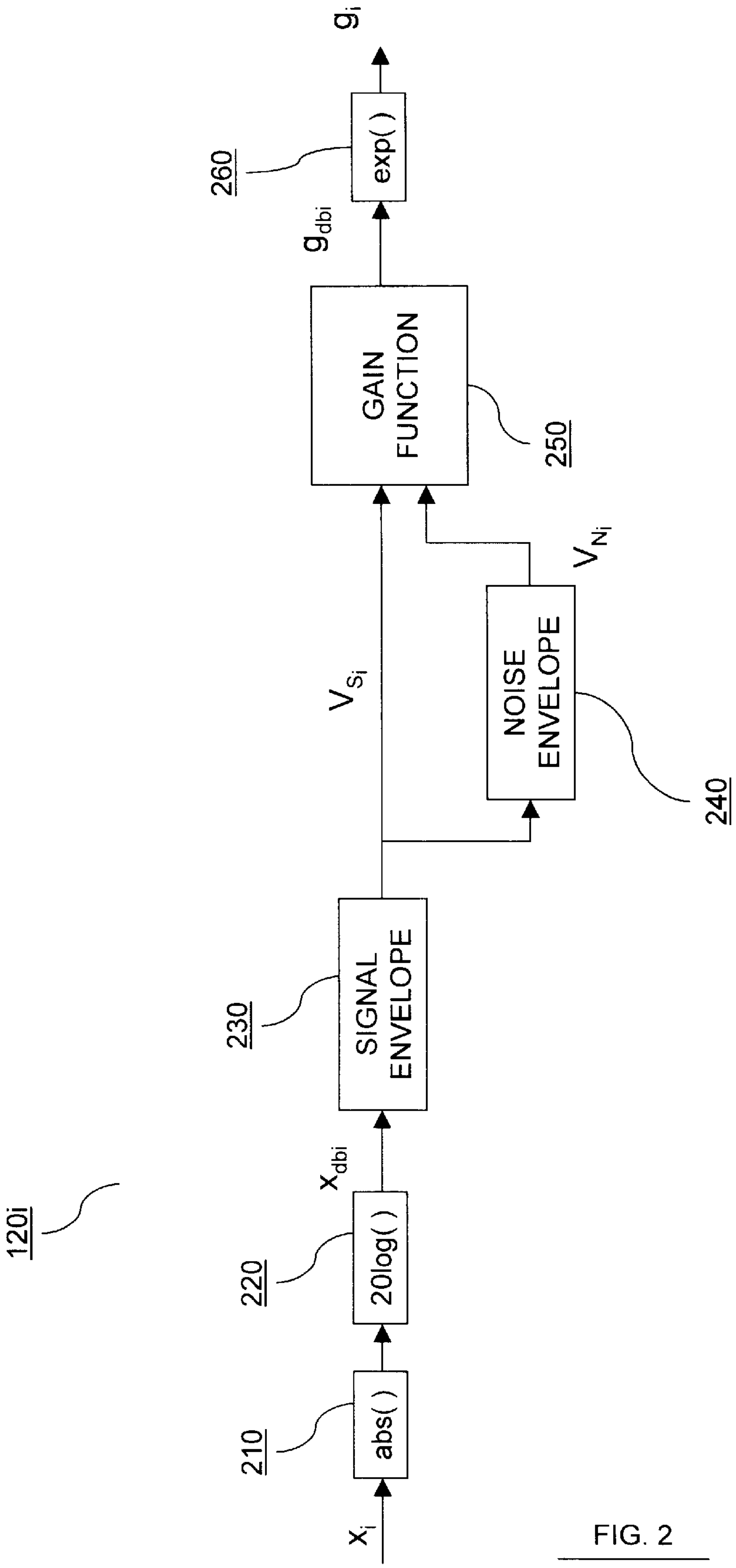
FIG. 2 is a block diagram illustrating the gain computation processing techniques in one frequency band according to aspects of the present invention.

The gain computation circuitry 120*i* in each band is illustrated in FIG. 2. As shown in FIG. 2, the absolute value (i.e., magnitude) of the band-pass signal is calculated in block 210, followed by a conversion into to the decibel domain at block 220. Then, at block 230, the noisy signal envelope, Vsi, is estimated in the dB domain, and the noise envelope, Vni, is estimated in the dB domain at block 240. At step 250, the spectral subtraction gain, $g_{dbi}$, is also obtained in the dB domain (based on the output of blocks 230 and 240) and then converted back into the magnitude domain at block 260 for spectral subtraction.

Still referring to FIG. 2, the signal envelope is computed in block 230 using a first order Infinite Impulse Response ("IIR") filter, and can be expressed as:

$$Vsi(n)=\tau_s Vsi(n-1)+(1-\tau_s)x_{dbi},$$

The noise signal envelope, Vni, is obtained at block 240 by further smoothing the noisy signal envelope as shown below. Slow attack time and fast release time is applied.

$$Vni(n)=\tau_n Vni(n-1)+(1-\tau_n)Vsi(n) \text{ for } Vsi(n)>Vni(n-1)$$

$$Vni(n)=Vsi(n) \text{ otherwise}$$

It is well known to those skilled in the art of audio noise reduction that signal loudness is usually described in decibel ("dB") units. It is therefore more straightforward to analyze the spectral subtraction technique according to the present invention in the decibel domain. Thus, the spectral subtraction according to the present invention can be generalized in the dB domain as follows:

$$|\hat{S}(f)|_{db}=|H(f)|_{db}+|X(f)|_{db},$$

Figure 3:
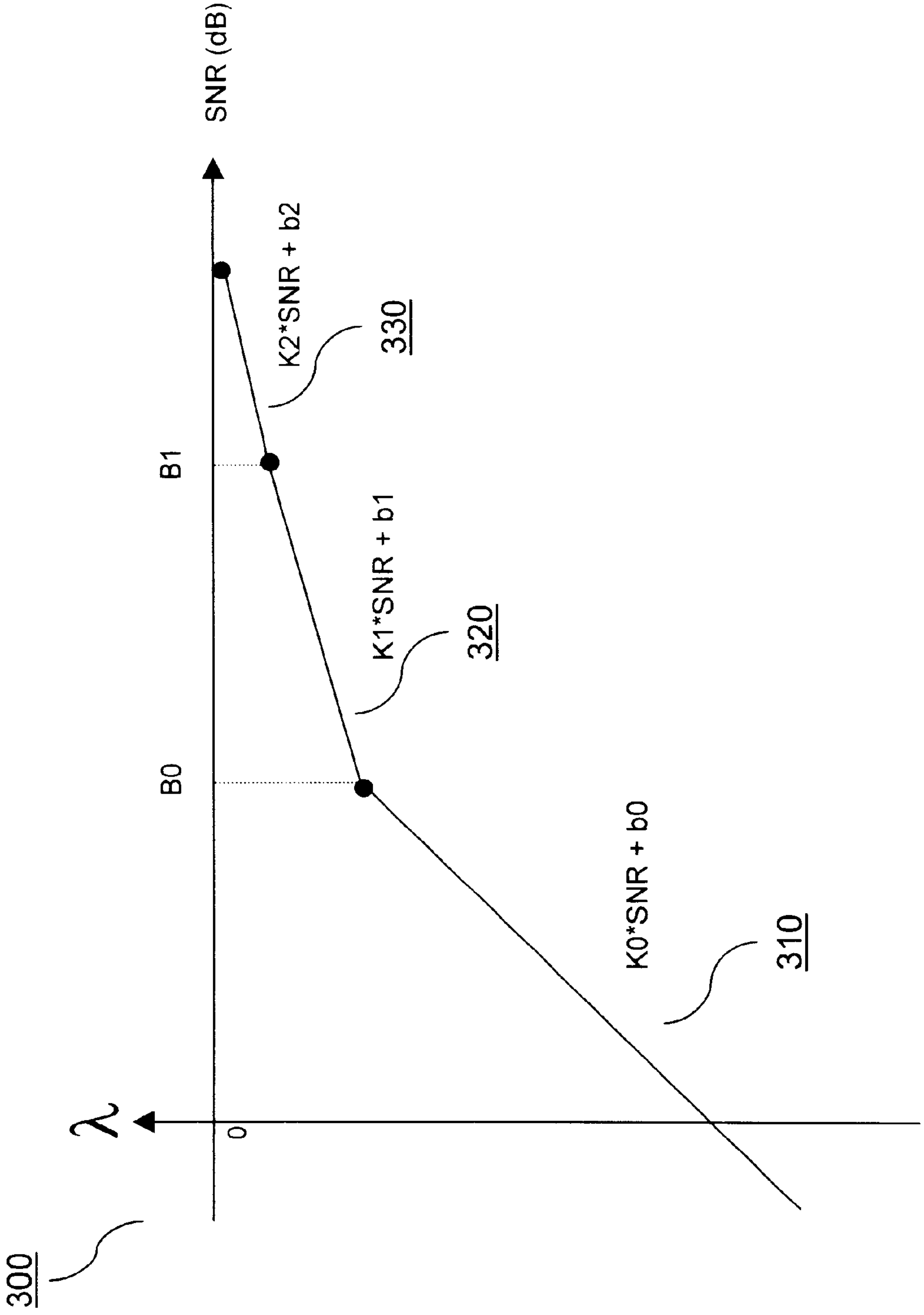
FIG. 3. is a diagram illustrating a gain scale function according to aspects of the present invention.

The undesired residual noise inherent to many spectral subtraction techniques is primarily due to the steep gain curve in the region close to 0 dB SNR, and an erroneous estimation of the noise spectrum can cause large chaoges in the subtracted amount. Thus, instead of using a parametric gain function or an expansion function, embodiments of the present invention predefine a spectral subtraction gain curve in the dB domain. As previously mentioned, the complete removal of perceptual noise is not desirable in most speech communication applications. With this in mind, the spectral subtraction gain curve according to embodiments of the present invention is defined in such a way that the attenuated noise falls off to a comfortable loudness level. Considering computational complexity and sound quality, in one embodiment of the present invention, the gain function is defined as follows:

$$g_{dh}=\lambda(\mathrm{SNR})\cdot f(Vn),$$

where λ(SNR) is the gain scale function and is limited to values in the range from [−1 to 0]. The maximum attenuation is applied to the signal when λ(SNR) is equal to −1 and no attenuation is applied when λ(SNR) is equal to 0. The idea underlying the design of the above equation is that little or no noise reduction is desired for a quiet signal or a noisy signal with a high SNR, and that more reduction is applied to a noisy signal with a lower SNR. Therefore, the gain scale function is predefined based on the preferred noise reduction curve versus SNR. For simplicity, three line segments are employed in embodiments of the present invention, as shown in FIG. 3. However, a different number of line segments may be employed, depending on each particular application, without depating from the spirit of the present invention.

As shown in FIG. 3, the gain scale function 300 consists of three piecewise linear sections 310–330 in the decibel domain, including a first section 310 providing maximum expansion up to a first knee point for maximum noise reduction, a second section 320 providing less expansion up to the second knee point for less noise reduction, and a third section 330 providing minimum or no expansion for signals with high SNR to minimize the distortion.

The function ƒ(Vn) is defined as the maximum attenuation function for noise reduction and used to control noise attenuation amount according to noise levels. Thus, the gain for noise reduction according to embodiments of the present invention is not only nonlinearly proportional to the SNR, but may also depend on the noise level, such as when ƒ(Vn)=Vn. In a quiet environment, little attenuation is attempted, even when the SNR is low.

In one embodiment of the present invention, the audio sampling frequency is 20 kHz, and the input signal is split into nine bands, with center frequencies of 500 Hz, 750 Hz, 1000 Hz, 1500 Hz, 2000 Hz, 3000 Hz, 4000 Hz, 6000 Hz, and 8000 Hz. The synthesis filter 130 is simply implemented as adder that combines the nine processed signals after spectral subtraction is performed on each band. Other embodiments of the present invention can be implemented by those skilled in the art without departing from the spirit of the invention.

Three different gain scale functions are used for each band, corresponding to the three different levels of noise reduction (defined as high, medium and low noise reduction) described in FIG. 4 (where the coefficient values listed in FIG. 4 refer to the variables of the gain scale function shown in FIG. 3). The maximum attenuation function ƒ(Vn) was tested for two different cases: ƒ(Vn)=18 dB and ƒ(Vn)=Vn dB. The time constant Ts for signal envelope detection was chosen to be $(1-2^{-9})$, with an attack time constant Tn for noise envelope of $(1-2^{-15})$. A speech and non-speech detector is also employed in the noise envelope estimation. The noise envelope is updated only when speech is not present. The procedure to estimate the noise envelope is to update Vni using the IIR filter as described above if (Vsi−Vni) is greater than 2.2577 for 1.6384 seconds or if Vsi<Vni; otherwise Vni is not updated.

Those skilled in the art will realize that it is very straightforward to apply the noise reduction algorithm according to the present invention to other speech communication systems, such as public address systems, tele-conference systems, voice control systems, or speaker phones. However, a hearing aid also has its own gain fuinction to map the full dynamic range of normal persons to the limited perceptual dynamic range of the hearing-impaired individual. Thus, in FIG. 5, a gain computation architecture 500 specially adapted for hearing loss compensation is presented by combining the noise reduction scheme shown in FIG. 1 with the hearing loss compensation scheme, where like elements are labeled with the same numeral.

Figure 5:
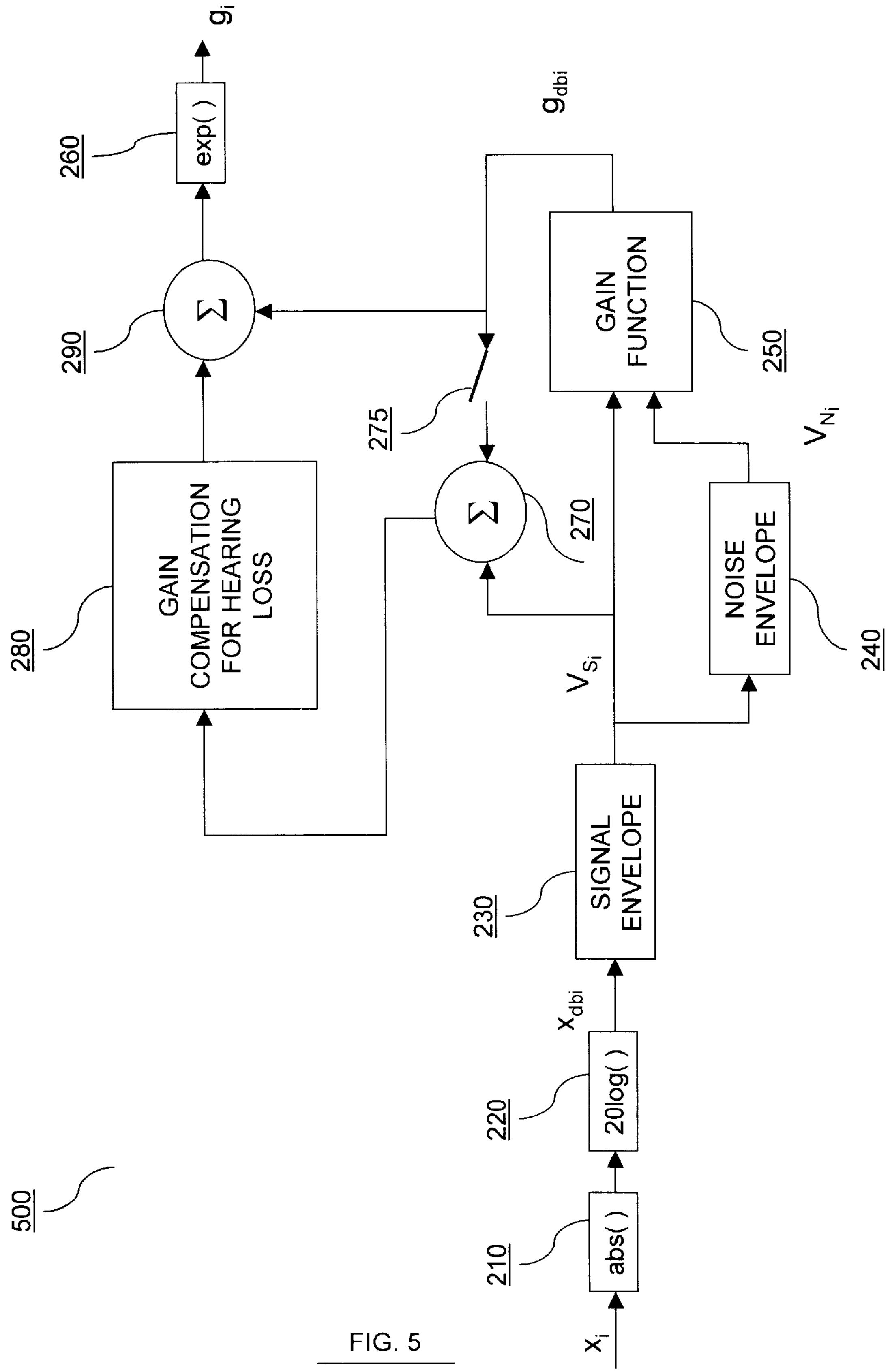
FIG. 5 is a block diagram of a gain computation processing system comprising noise reduction and hearing loss compensation for use in hearing aid applications according to one embodiment of the present invention.

As shown in FIG. 5, the noise reduction can either be hearing loss dependent or independent. When the switch 275 is closed, the noise reduction is hearing loss dependent, and it can be seen that the signal envelope used for hearing loss compensation is adjusted first by the spectral subtraction circuit comprising blocks 210, 220, 230, 240, and 250. That suggests that the spectral subtraction amount should vary with hearing loss. Less spectral subtraction should be required for hearing-impaired individuals with more severe hearing loss in order to reduce the noise to a comfortable level or to just below the individual's threshold. Referring back to FIG. 5, when switch 275 is closed, the output of gain function 250 is combined with the output of signal envelope detector 230 at adder 270, and the output of adder 270 is used as the input to the "gain compensation for hearing loss" block 280. When switch 275 is open, the noise reduction is hearing loss independent, and the output of adder 270 is directly equal to the output of signal envelope detector 230. In either case, the output of the "gain compensation for hearing loss" block 280 is combined with the output of gain function 250 at adder 290, and the resulting output is once again converted back into the magnitude domain at block 260.

Compared with prior art spectral subtraction algorithms, the algorithm according to embodiments of the present invention proposes a different spectral subtraction scheme for noise reduction by considering computational efficiency while maintaining optimal sound quality. The gain function depends on both the SNR and the noise envelope, instead of only using the SNR. In addition, the SNR-dependent part in the gain function, that is a gain scale function, can be predefined to reduce undesirable artifacts typical of spectral subtraction noise reduction techniques. The predefined gain scale function can be approximated by a piecewise-linear function. If three segment lines are employed as a gain scale function, as has discussed above, the algorithm is very simple to implement. Those skilled in the art will recognize that the techniques according to the present invention can be adapted for use with other gain scale functions and still fall within the scope of the appended claims.

Evaluation results of embodiments of the present invention with human patients demonstrated that the residual noise is inaudible. Moreover, the simplicity of the noise reduction algorithm according to embodiments of the present invention makes it very suitable for hearing aid applications.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for reducing noise in audio processing applications, the method comprising:

separating audio signals through an analysis filter into a plurality of processing bands, wherein each said processing band processes said audio signals within a predetermined frequency band;

generating a gain function for noise reduction in each said processing band, wherein said gain function comprises a gain scale function providing a predetermined amount of gain as a function of a ratio of a signal envelope to a noise envelope and a maximum attenuation function providing a predetermined maximum attenuation;

combining the output of each said gain function with the input of each said gain function in a multiplying circuit; and combining the outputs of said multiplying circuits in a synthesis filter to produce a stream of processed audio samples, wherein said generating a gain function for noise reduction in each said processing band comprises:

(1) calculating the magnitude of each of a stream of input samples;

(2) converting the output of step (1) into the decibel domain;

(3) estimating the signal envelope of the output of step (2);

(4) estimating the noise envelope based on the output of step (3);

(5) generating a decibel domain gain scale function for noise reduction as a function of the outputs of steps (3) and (4);

(6) generating a decibel domain maximum attenuation function;

(7) combining the outputs of steps (5) and (6); and (8) converting the output of step (7) from the decibel domain to the magnitude domain.

2. The method according to claim 1, wherein said decibel domain gain scale function comprises at least three linear sections with a first section providing maximum expansion up to a first knee point for maximum noise reduction, a second section providing less expansion up to a second knee point for less noise reduction, and a third section providing minimum or no expansion to minimize distortion and wherein the amount of expansion in any or all of the first, second, and third sections depends on the ratio of the signal envelope to the noise envelope, and wherein said decibel domain maximum attenuation function is either a constant or equal to said noise envelope.

3. A noise reduction apparatus comprising:

an analysis filter for separating audio signals into a plurality of outputs;

a plurality of processing bands, wherein the number of processing bands equals the number of outputs and one of said plurality of processing bands is connected to each one of said plurality of outputs, wherein each of said plurality of processing bands processes said audio signals within a predetermined frequency band, and wherein each of said plurality of processing bands comprises:

circuitry for generating a gain function for noise reduction, wherein said gain function comprises a gain scale function providing a predetermined amount of gain as a function of a ratio of a signal envelope to a noise envelope and a maximum attenuation function providing a predetermined maximum attenuation; and a multiplier having a first input coupled to the output of said circuitry and having a second input coupled to the input of said circuitry; and a synthesis filter for combining the outputs of all of said plurality of processing bands into a stream of processed audio samples, wherein said circuitry for generating a gain function for noise reduction comprises:

an absolute value circuit having an input coupled to one of said outputs of said analysis filter;

a logarithmic circuit coupled to the output of said absolute value circuit for converting the output of said absolute value circuit into the decibel domain;

a signal envelope estimator coupled to the output of said logarithmic circuit;

a noise envelope estimator coupled to the output of said signal envelope estimator;

a decibel domain amplifier having a first input coupled to the output of said signal envelope estimator and having a second input coupled to the output of said noise envelope estimator; and an exponential circuit coupled to the output of said decibel domain amplifier for converting the output of said decibel domain amplifier from the decibel domain to the magnitude domain.

4. The apparatus according to claim 3, wherein said decibel domain amplifier generates a decibel domain gain scale function and a decibel domain maximum attenuation function, wherein said decibel domain gain scale function comprises at least three linear sections with a first section providing maximum expansion up to a first knee point for maximum noise reduction, a second section providing less expansion up to a second knee point for less noise reduction, and a third section providing minimum or no expansion to minimize distortion and wherein the amount of expansion in any or all of the first, second, and third sections depends on the ratio of the signal envelope to the noise envelope, and wherein said decibel domain maximum attenuation function is either a constant or equal to said noise envelope.

5. A noise reduction apparatus comprising:

an analysis filter for separating audio signals into a plurality of outputs;

a plurality of processing bands, wherein the number of processing bands equals the number of outputs and one of said plurality of processing bands is connected to each one of said plurality of outputs, wherein each of said plurality of processing bands processes said audio signals within a predetermined frequency band, and wherein each of said plurality of processing bands comprises:

circuitry for generating a gain function for noise reduction, wherein said gain function comprises a gain scale function providing a predetermined amount of gain as a function of a ratio of a signal envelope to a noise envelope and a maximum attenuation function providing a predetermined maximum attenuation; and a multiplier having a first input coupled to the output of said circuitry and having a second input coupled to the input of said circuitry; and a synthesis filter for combining the outputs of all of said plurality of processing bands into a stream of processed audio samples, wherein said circuitry for generating a gain function for noise reduction further comprises a gain function for hearing loss compensation and wherein the circuitry for generating a gain function for noise reduction and hearing loss compensation comprises:

an absolute value circuit having an input coupled to one of said outputs of said analysis filter;

a logarithmic circuit coupled to the output of said absolute value circuit for converting the output of said absolute value circuit into the decibel domain;

a signal envelope estimator coupled to the output of said logarithmic circuit;

a noise envelope estimator coupled to the output of said signal envelope estimator;

a decibel domain amplifier for noise reduction having a first input coupled to the output of said signal envelope estimator and having a second input coupled to the output of said noise envelope estimator;

a first summing circuit having a first input coupled to the output of said decibel domain amplifier for noise reduction and having a second input coupled to the output of said signal envelope estimator;

a decibel domain amplifier for hearing loss having an input coupled to the output of said first summing circuit;

a second summing circuit having a first input coupled to the output of said decibel domain amplifier for hearing loss and having a second input coupled to the output of said decibel domain amplifier for noise reduction; and an exponential circuit coupled to the output of said second summing circuit for converting the output of said second summing circuit from the decibel domain to the magnitude domain.

6. The apparatus according to claim 5, wherein said decibel domain amplifier for noise reduction applies a decibel domain gain scale function and a decibel domain maximum attenuation function, wherein said decibel domain gain scale function comprises at least three linear sections with a first section providing maximum expansion up to a first knee point for maximum noise reduction, a second section providing less expansion up to a second knee point for less noise reduction, and a third section providing minimum or no expansion to minimize distortion and wherein the amount of expansion in any or all of the first, second, and third sections depends on the ratio of the signal envelope to the noise envelope, and wherein said decibel domain maximum attenuation function is either a constant or equal to said noise envelope.

7. A method for reducing noise in audio processing applications, the method comprising:

separating audio signals through an analysis filter into a plurality of processing bands, wherein each said processing band processes said audio signals within a predetermined frequency band;

generating a gain function for noise reduction in each said processing band, wherein said gain function comprises a gain scale function providing a predetermined amount of gain as a function of a ratio of a signal envelope to a noise envelope and a maximum attenuation function providing a predetermined maximum attenuation;

combining the output of each said gain function with the input of each said gain function in a multiplying circuit; and combining the outputs of said multiplying circuits in a synthesis filter to produce a stream of processed audio samples, wherein said generating a gain function for noise reduction in each said processing band further comprises a gain function for hearing loss compensation in each said processing band and wherein said generating a gain function for noise reduction and hearing loss compensation comprises:

(1) calculating the magnitude of each of a stream of input samples;

(2) converting the output of step (1) into the decibel domain;

(3) estimating the signal envelope of the output of step (2);

(4) estimating the noise envelope based on the output of step (3);

(5) generating a decibel domain gain scale function for noise reduction as a function of the outputs of steps (3) and (4);

(6) generating a decibel domain maximum attenuation function;

(7) combining the outputs of steps (5) and (6);

(8) generating a decibel domain gain function for hearing loss as a function of the output of step (3);

(9) summing the outputs of steps (7) and (8); and

(10) converting the output of step (9) from the decibel domain to the magnitude domain.

8. A noise reduction apparatus comprising:

an analysis filter for separating audio signals into a plurality of outputs;

a plurality of processing bands, wherein the number of processing bands equals the number of outputs and one of said plurality of processing bands is connected to each one of said plurality of outputs, wherein each of said plurality of processing bands processes said audio signals within a predetermined frequency band, and wherein each of said plurality of processing bands comprises:

circuitry for generating a gain function for noise reduction, wherein said gain function comprises a gain scale function providing a predetermined amount of gain as a function of a ratio of a signal envelope to a noise envelope and a maximum attenuation function providing a predetermined maximum attenuation; and a multiplier having a first input coupled to the output of said circuitry and having a second input coupled to the input of said circuitry; and a synthesis filter for combining the outputs of all of said plurality of processing bands into a stream of processed audio samples, wherein said circuitry for generating a gain function for noise reduction further comprises a gain function for hearing loss compensation and wherein the circuitry for generating a gain function for noise reduction and hearing loss compensation comprises:

an absolute value circuit having an input coupled to one of said outputs of said analysis filter;

a logarithmic circuit coupled to the output of said absolute value circuit for converting the output of said absolute value circuit into the decibel domain;

a signal envelope estimator coupled to the output of said logarithmic circuit;

a noise envelope estimator coupled to the output of said signal envelope estimator;

a decibel domain amplifier for noise reduction having a first input coupled to the output of said signal envelope estimator and having a second input coupled to the output of said noise envelope estimator;

a decibel domain amplifier for hearing loss compensation having an input coupled to the output of said signal envelope estimator;

a summing circuit having a first input coupled to the output of said decibel domain amplifier for hearing loss compensation and having a second input coupled to the output of said decibel domain amplifier for noise reduction; and an exponential circuit coupled to the output of said summing circuit for converting the output of said summing circuit from the decibel domain to the magnitude domain.

9. A method of reducing noise in audio applications, the method comprising:

generating a gain function for noise reduction to include (1) a gain scale function and (2) a maximum attenuation function, wherein said gain scale function provides a predetermined amount of gain as a function of a combination of (A) the ratio of a signal envelope to a noise envelope and (B) the noise envelope, wherein said gain scale function is a piecewise linear function in the logarithmic domain, and wherein said maximum attenuation function provides a predetermined maximum attenuation.

10. The method according to claim 9, wherein said piecewise linear function comprises a plurality of linear sections with at least a first section providing expansion up to a first knee point for noise reduction and at least a second section providing minimum or no expansion to minimize distortion and wherein the amount of expansion in any or all of said plurality of sections depends on the ratio of the signal envelope to the noise envelope.

11. The method according to claim 9, wherein said maximum attenuation function is either a constant or proportional to said noise envelope.

12. The method according to claim 9, further comprising:

(1) calculating the magnitude of each of a stream of input samples;

(2) converting the output of step (1) into the logarithmic domain;

(3) estimating the signal envelope of the output of step (2);

(4) estimating the noise envelope based on the output of step (3);

(5) combining the outputs of said gain scale function and said maximum attenuation function; and (6) converting the output of step (5) from the logarithmic domain to the magnitude domain.

13. The method according to claim 9, wherein said generating a gain function for noise reduction further comprises a gain function for hearing loss compensation and wherein said generating a gain function for noise reduction and hearing loss compensation comprises:

(1) calculating the magnitude of each of a stream of input samples;

(2) converting the output of step (1) into the logarithmic domain;

(3) estimating the signal envelope of the output of step (2);

(4) estimating the noise envelope based on the output of step (3);

(5) combining the outputs of said gain scale function and said maximum attenuation function;

(6) summing the outputs of steps (3) and (5);

(7) generating, a logarithmic domain gain function for hearing loss as a function of the output of step (6);

(8) summing the outputs of steps (5) and (7); and (9) converting the output of step (8) from the logarithmic domain to the magnitude domain.

14. The method according to claim 9, wherein said generating a gain function for noise reduction further comprises a gain function for hearing loss compensation and wherein said generating a gain function for noise reduction and hearing loss compensation comprises:

(1) calculating the magnitude of each of a stream of input samples;

(2) converting the output of step (1) into the logarithmic domain;

(3) estimating the signal envelope of the output of step (2);

(4) estimating the noise envelope based on the output of step (3);

(5) combining the outputs of said gain scale function and said maximum attenuation function;

(6) generating a logarithmic domain gain function for hearing loss as a function of the output of step (3);

(7) summing the outputs of steps (5) and (6); and (8) converting the output of step (7) from the logarithmic domain to the magnitude domain.

15. An audio processor for reducing noise in audio applications, the audio processor comprising:

circuitry for generating a gain function for noise reduction to include (1) a gain scale function and (2) a maximum attenuation function, wherein said gain scale function provides a predetermined amount of gain as a function of a combination of (A) the ratio of a signal envelope to a noise envelope and (B) the noise envelope, wherein said gain scale function is a piecewise linear function in the logarithmic domain, and wherein said maximum attenuation function provides a predetermined maximum attenuation.

16. The audio processor according to claim 15, wherein said piecewise linear function comprises a plurality of linear sections with at least a first section providing expansion up to a first knee point for noise reduction and at least a second section providing minimum or no expansion to minimize distortion and wherein the amount of expansion in any or all of said plurality of sections depends on the ratio of the signal envelope to the noise envelope.

17. The audio processor according to claim 15, wherein said maximum attenuation function is either a constant or proportional to said noise envelope.

18. The audio processor according to claim 15, wherein said circuitry for generating a gain function for noise reduction comprises:

an absolute value circuit having an input and an output;

a logarithmic circuit coupled to the output of said absolute value circuit for converting the output of said absolute value circuit into the logarithmic domain;

a signal envelope estimator coupled to the output of said logarithmic circuit;

a noise envelope estimator coupled to the output of said signal envelope estimator;

a logarithmic domain amplifier having a first input coupled to the output of said signal envelope estimator and having a second input coupled to the output of said noise envelope estimator; and an exponential circuit coupled to the output of said logarithmic domain amplifier for converting the output of said logarithmic domain amplifier from the logarithmic domain to the magnitude domain.

19. The audio processor according to claim 15, wherein said circuitry for generating a gain function for noise reduction further comprises a gain function for hearing loss compensation and wherein the circuitry for generating a gain function for noise reduction and hearing loss compensation comprises:

an absolute value circuit having an input and an output;

a logarithmic circuit coupled to the output of said absolute value circuit for converting the output of said absolute value circuit into the logarithmic domain;

a signal envelope estimator coupled to the output of said logarithmic circuit;

a noise envelope estimator coupled to the output of said signal envelope estimator;

a logarithmic domain amplifier for noise reduction having a first input coupled to the output of said signal envelope estimator and having a second input coupled to the output of said noise envelope estimator;

a first summing circuit having a first input coupled to the output of said logarithmic domain amplifier for noise reduction and having a second input coupled to the output of said signal envelope estimator;

a logarithmic domain amplifier for hearing loss having an input coupled to the output of said first summing circuit;

a second summing circuit having a first input coupled to the output of said logarithmic domain amplifier for hearing loss and having a second input coupled to the output of said logarithmic domain amplifier for noise reduction; and an exponential circuit coupled to the output of said second summing circuit for converting the output of said second summing circuit from the logarithmic domain to the magnitude domain.

20. The audio processor according to claim 15, wherein said circuitry for generating a gain function for noise reduction further comprises a gain function for hearing loss compensation and wherein the circuitry for generating a gain function for noise reduction and hearing loss compensation comprises:

an absolute value circuit having an input and an output;

a logarithmic circuit coupled to the output of said absolute value circuit for converting the output of said absolute value circuit into the logarithmic domain;

a signal envelope estimator coupled to the output of said logarithmic circuit;

a noise envelope estimator coupled to the output of said signal envelope estimator;

a logarithmic domain amplifier for noise reduction having a first input coupled to the output of said signal envelope estimator and having a second input coupled to the output of said noise envelope estimator;

a logarithmic domain amplifier for hearing loss compensation having an input coupled to the output of said signal envelope estimator;

a summing circuit having a first input coupled to the output of said logarithmic domain amplifier for hearing loss compensation and having a second input coupled to the output of said logarithmic domain amplifier for noise reduction; and an exponential circuit coupled to the output of said summing circuit for converting the output of said summing circuit from the logarithmic domain to the magnitude domain.

* * * * *

UNITED STATES PATENT AND TRADEMARK OFFICE

CERTIFICATE OF CORRECTION

PATENT NO. : 6,757,395 B1
DATED : June 29, 2004
INVENTOR(S) : Fang et al.

It is certified that error appears in the above-identified patent and that said Letters Patent is hereby corrected as shown below:

Title page,
Item [56], References Cited, OTHER PUBLICATIONS, remove the repeat listing of the reference “Lim, et al., “Enhancement and Bandwidth Compression of Noisy Speech”, 1979, IEEE, vol. 67 No. 12, pp. 1586-1604”.

Column 5,
Line 37, replace “fuinction” with -- function --.

Column 6,
Line 62, replace “chaoges” with -- changes --.

Column 7,
Line 8, replace “8.dh” with -- g.sub.db --.
Line 22, replace “depating” with -- departing --.

Column 8,
Line 4, replace “fuinction” with -- function --.

Signed and Sealed this

Eighteenth Day of October, 2005

JON W. DUDAS
*Director of the United States Patent and Trademark Office*